(12) United States Patent
Schmid et al.

(10) Patent No.: US 9,916,187 B2
(45) Date of Patent: Mar. 13, 2018

(54) GRAPH DATABASE SYSTEM THAT DYNAMICALLY COMPILES AND EXECUTES CUSTOM GRAPH ANALYTIC PROGRAMS WRITTEN IN HIGH-LEVEL, IMPERATIVE PROGRAMMING LANGUAGE

(71) Applicant: Oracle International Corporation, Redwood Shores, CA (US)

(72) Inventors: Korbinian Schmid, Bavaria (DE); Martin Sevenich, Palo Alto, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 204 days.

(21) Appl. No.: 14/524,838

(22) Filed: Oct. 27, 2014

(65) Prior Publication Data

US 2016/0117358 A1 Apr. 28, 2016

(51) Int. Cl.
*G06F 17/30* (2006.01)
*G06F 9/50* (2006.01)
(Continued)

(52) U.S. Cl.
CPC .............. *G06F 9/5083* (2013.01); *G06F 8/31* (2013.01); *G06F 8/456* (2013.01);
(Continued)

(58) Field of Classification Search
CPC ......... G06F 17/30386; G06F 17/30867; G06F 17/30321; G06F 17/30958; G06F 8/443;
(Continued)

(56) References Cited

U.S. PATENT DOCUMENTS 7,971,194 B1 * 6/2011 Gilboa ...................... G06F 8/10
717/106
9,182,952 B2 * 11/2015 Qi ............................ G06F 8/35
717/146
(Continued)

OTHER PUBLICATIONS

Pey, Larriba, "News and Events—Performance in Action", Management of Mobile Device Data, Sparsity-Technologies, http://sparsity-technologies.com/blog/, last viewed on May 6, 2015, 11 pages.
(Continued)

*Primary Examiner* — Anh Ly
(74) *Attorney, Agent, or Firm* — Hickman Palermo Becker Bingham LLP; Daniel D. Ledesma

(57) ABSTRACT

Techniques are provided for a graph database system that accepts custom graph analytic programs that are written in a high-level graph-specific programming language and compiles the programs into executables that, when executed, directly access graph data of a graph that is stored in the graph database. In this way, a low-level data-access API is avoided. Also, a graph analytic program, which only describes an abstract description of an algorithm, does not include any details regarding data access. In one technique, a user is not required to include explicit parallelization in a graph analytic program in order for the graph analytic program to take advantage of parallelization. A compiler of the graph database system identifies portions of the graph analytic program that can benefit from parallelization and, in response, generates parallelized executable code that corresponds to those portions.

22 Claims, 4 Drawing Sheets

(51) Int. Cl.
*G06F 9/44* (2018.01)
*G06F 9/45* (2006.01)
*H04L 29/08* (2006.01)

(52) U.S. Cl.
CPC .. *G06F 17/30321* (2013.01); *G06F 17/30386* (2013.01); *G06F 17/30442* (2013.01); *G06F 17/30958* (2013.01); *H04L 67/10* (2013.01)

(58) Field of Classification Search
CPC ............... G06F 17/30979; G06F 17/30; G06F 12/0862; G06F 2212/602; G06F 2212/603; G06F 17/30864; G06F 17/30011; G06F 9/5083; G06F 17/30442; G06T 8/31; G06F 8/456; G06T 1/60; G06T 11/206; G10L 15/00; H04L 67/10
See application file for complete search history.

(56) References Cited

U.S. PATENT DOCUMENTS

| | | | |
|---|---|---|---|
| 2002/0087275 A1* | 7/2002 | Kim | G06F 19/26 702/19 |
| 2002/0129340 A1* | 9/2002 | Tuttle | G06F 17/30867 717/132 |
| 2007/0038987 A1 | 2/2007 | Ohara | |
| 2007/0239694 A1* | 10/2007 | Singh | G06F 17/30958 707/E17.014 |
| 2008/0028474 A1 | 1/2008 | Horne | |
| 2009/0119641 A1* | 5/2009 | Ramsey | G06F 17/30421 717/114 |
| 2009/0235237 A1* | 9/2009 | Song | G06F 8/456 717/132 |
| 2010/0088665 A1* | 4/2010 | Langworthy | G06F 8/75 717/104 |
| 2010/0088666 A1* | 4/2010 | Box | G06F 8/42 717/104 |
| 2010/0144629 A1 | 6/2010 | Beardsley | |
| 2011/0307897 A1* | 12/2011 | Atterbury | G06F 9/4436 718/102 |
| 2012/0159459 A1* | 6/2012 | Turner | G06F 8/314 717/138 |
| 2012/0188249 A1 | 7/2012 | Kretz | |
| 2012/0222030 A1 | 8/2012 | Goossen | |
| 2013/0013567 A1 | 1/2013 | Constantinescu | |
| 2013/0046894 A1 | 2/2013 | Said | |
| 2013/0097136 A1* | 4/2013 | Goldberg | G06F 17/30289 707/704 |
| 2013/0290282 A1* | 10/2013 | Faerber | G06F 17/30153 707/693 |
| 2013/0305095 A1* | 11/2013 | Chishiro | G06F 11/3414 714/38.1 |
| 2014/0136555 A1* | 5/2014 | Jacob | G06F 17/30958 707/754 |
| 2014/0195518 A1* | 7/2014 | Kelsey | G06F 17/30539 707/722 |
| 2014/0359559 A1* | 12/2014 | Qi | G06F 8/35 717/105 |
| 2015/0022538 A1* | 1/2015 | Munshi | G06F 9/5027 345/522 |
| 2015/0024158 A1* | 1/2015 | Bhargava | D01F 6/80 428/36.9 |
| 2015/0026158 A1* | 1/2015 | Jin | G06F 17/30979 707/722 |
| 2015/0095182 A1* | 4/2015 | Zhou | H04N 21/4668 705/26.7 |
| 2015/0363476 A1 | 12/2015 | Li | |
| 2015/0378697 A1* | 12/2015 | Sathyanathan | G06F 8/41 717/146 |
| 2016/0012152 A1* | 1/2016 | Johnson | G06F 17/30958 707/798 |
| 2016/0063037 A1 | 3/2016 | Savkil | |
| 2016/0140152 A1 | 5/2016 | Sevenich et al. | |
| 2016/0188391 A1* | 6/2016 | Ekanadham | G06F 9/547 719/328 |
| 2017/0339209 A1 | 11/2017 | Schmid | |

OTHER PUBLICATIONS

Neo4j Graph Database, "What is a Graph Database?", http://neo4j.com/developer/graph-database/, last viewed on May 6, 2015, 7 pages.

Hong et al., "Green-Marl: A DSL for Easy and Efficient Graph Analysis", ASPLOS'Mar. 12, 2012, AMC, 14 pages.

Giraph "Introduction to Apache Giraph", http://giraph.apache.org/intro.html, last viewed on May 6, 2015, 2 pages.

Dato.com, "GraphLab Create User Guide", Introduction, 1 page, last viewed on May 6, 2015, 1 page.

Servenich, U.S. Appl. No. 14/543,058, filed Nov. 17, 2014, Office Action, dated Sep. 5, 2017.

* cited by examiner

GRAPH DATABASE SYSTEM THAT DYNAMICALLY COMPILES AND EXECUTES CUSTOM GRAPH ANALYTIC PROGRAMS WRITTEN IN HIGH-LEVEL, IMPERATIVE PROGRAMMING LANGUAGE

FIELD OF THE DISCLOSURE

The present disclosure relates generally to graph database systems and, more specifically, to graph database systems that compile custom graph analytic programs written in an imperative programming language into executables that directly access graph data.

BACKGROUND

Graph analysis is a type of data analysis where the dataset is modeled as a graph. Graph analysis is used to identify arbitrary relationships between data entities. By applying certain graph analysis algorithms on a graph, a user may be able to discover non-immediate insight about the dataset.

Currently, there are a number of graph databases, such as Neo4J and DEX. These graph databases provide basic management of graph data in persistent data storages. These graph databases provide a low-level application programming interface (API) that a user can use to access graph data from persistent storage. Therefore, if a user wants to run a graph algorithm on top of the graph data, then the user must come up with an implementation on top of the low-level API.

FIG. 1 is a block diagram that depicts this conventional approach for implementing graph algorithms. A user composes a manual implementation 110, which is an implementation of a graph algorithm. Implementation 110 makes numerous calls through data access API 120 to retrieve and manipulate data from graph data 130. Example calls are "getVertex(1003)" where '1003' is an identifier for a particular vertex and "getOutGoingEdgesofVertex(25)" where '25' is an identifier for a particular vertex.

There are two main issues with this graph database approach. First, graph analysis algorithms typically perform a lot of data accesses. Thus, this approach imposes significant overhead on execution time to go through the data access API for each data access. Second, it is challenging for users to come up with an efficient and/or parallel implementation of graph analysis algorithms on top of the low-level API.

Furthermore, if the implementation 110 is loaded on one computing device and graph data 130 is loaded on another computing device, then the latency between the two computing devices compounds each data access through data access API 120.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
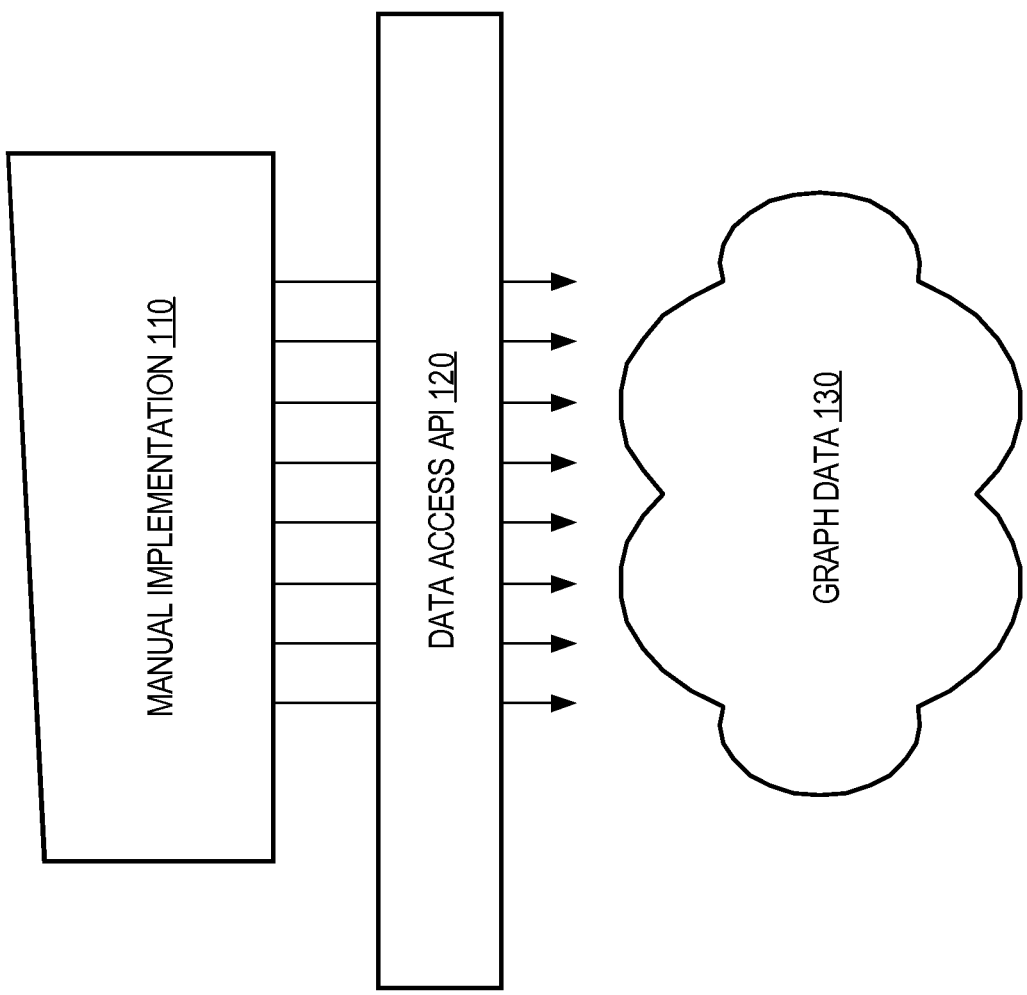
FIG. 1 is a block diagram that depicts a conventional approach for implementing graph algorithms.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for a graph database system that accepts custom graph analytic programs that are written in a high-level graph-specific programming language and compiles the programs into executables that, when executed, directly access graph data of a graph that is stored in the graph database. In this way, a low-level data-access API is avoided. Also, a graph analytic program, which only describes an abstract description of an algorithm, does not include any details regarding data access.

Also, in one technique, a user is not required to include explicit parallelization in a graph analytic program in order for the graph analytic program to take advantage of parallelization. A compiler of the graph database system identifies portions of the graph analytic program that can benefit from parallelization and, in response, generates parallelized executable code that corresponds to those portions.

Database Overview

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. In the context of relational data, one non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. In the context of graph data, an example of a graph database language that is supported by a graph database server is Green-Marl, a type of domain-specific language (DSL).

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement embodiments disclosed herein are not limited to any particular type of data container or database architecture.

Graph Database System Overview

Figure 2:
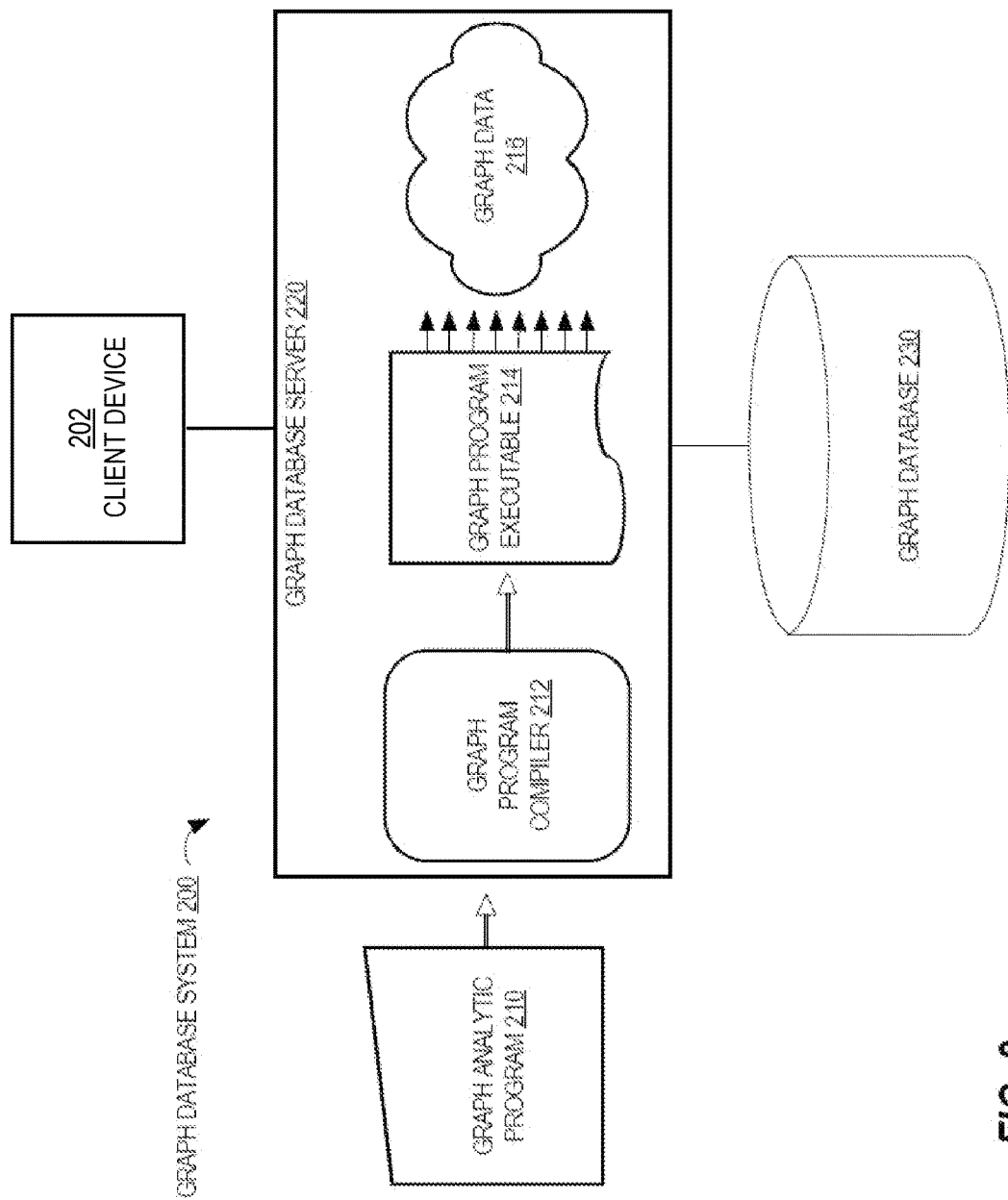
FIG. 2 is a block diagram that depicts an example graph database system, in an embodiment.

FIG. 2 is a block diagram that depicts an example graph database system 200, in an embodiment. Graph database system 200 includes a graph database server 220 and graph database 230 that persistently stores one or more datasets, each modeled as a graph, which is described in more detail below.

Although one client device 202 is depicted in FIG. 2, multiple clients may be communicatively coupled, through one or more networks, to graph database system 200. The clients are configured to send graph analytic programs, such as graph analytic program 210, to graph database system 200. The clients may be configured to allow users to compose the graph analytic programs. Additionally, the same (or different) clients may send other types of requests to graph database system 200, such as RDF queries or SPARQL queries, which graph database system 200 may be configured to process against datasets stores in graph database 230 and return valid result.

Graph database server 220 is a component that is implemented on one or more computing devices. If graph database server 220 is implemented on multiple computing devices, then the computing devices may be coupled to each other. Graph database server 220 may be implemented in software, hardware, or any combination of software and hardware.

Graph database server 220 includes a graph program compiler 212 that analyzes a graph analytic program (e.g., graph analytic program 210) and generates executable code, such as graph program executable 214. Graph program compiler 212 may generate and insert, into graph program executable 214, code that does correspond to any of the code in graph analytic program 210, from which graph program executable 214 is generated. Graph program compiler 212 may be implemented in software, hardware, or any combination of software and hardware.

A graph that graph analytic program 210 targets is loaded from persistent storage into volatile memory. This loading may be performed prior to receiving the graph analytic program that targets the graph or may be performed in response to receiving the graph analytic program. The graph data in volatile memory may be organized in a different format than the corresponding version that is stored persistently. For example, the graph data may be stored in a CSR format while the underlying dataset may be stored in a node table and/or an edge table.

Graph program executable 214 includes code that, when executed by an execution engine, directly accesses graph data 216, which is stored in volatile memory.

Graph Data

As noted previously, graph database 230 stores datasets about one or more graphs, each comprising multiple nodes and edges. If graph database 230 stores multiple graphs, then each graph represents a different set of data that is to be treated separately for graph analysis purposes. For example, one graph set may reflect relationships among users in one social network while another graph set may reflect relationships among users in another social network. As another example, one graph set may reflect relationships among users in a social network while another graph set may reflect connections among computing devices in a network.

Graph database 230 may be a relational database or an object database. For example, one node table in graph database 230 may include a row for each node in a graph. (Graph database 230 may store a different node table for each graph represented in the graph data.) Each column in the node table may correspond to a different attribute or property of the node, such as a name, an age, and a date, depending on the type of object the nodes represent.

Graph database 230 may also store an edge table that corresponds to the node table. Each row in the edge table corresponds to a different edge in the graph and each column in the edge table corresponds to a node that is connected to by another node through the corresponding edge. Thus, the edge table may have at least two columns, one for each of two nodes. The edge table may also have additional columns, each additional column corresponding to an attribute or characteristic about the corresponding edge.

Nodes in a graph may represent one of many different types of objects while edges that connect two nodes in the graph may represent one of many different types of relationships between the objects. Embodiments are not limited to any particular type of object or type of relationship.

For example, nodes in a graph may represent user accounts maintained by a social network that is provided by a social network provider, such as Facebook, Google+, LinkedIn, and Twitter. An edge in such a graph may represent that the two connecting nodes have established a relationship with each other or that one of the connecting nodes has decided to "follow" the other node (as in Twitter).

As another example, nodes in a graph may represent a network, such as the Internet, and edges in the graph may represent that computing devices are physically coupled to each other.

When a graph is stored in memory from graph database 230, the names or identifiers of each node may be converted to a different value. For example, if a node represents a user account (e.g., "johnsmith1986") maintained by a social network provider, then the user identifier that identifies that user account for the social network provider may be mapped to another value, such as 2032, indicating that the user account is at least one of 2032 (or 2033) user accounts in the graph. Thus, the data and, optionally, the format of a graph that is stored in graph database 230 may be different than the data and format of the corresponding graph in memory. Furthermore, the values of node identifiers in memory may be later mapped back to their respective original values that identify real-world objects, such as email addresses, IP addresses, MAC addresses, or social network account identifiers.

Example Graph Data

Figure 3:
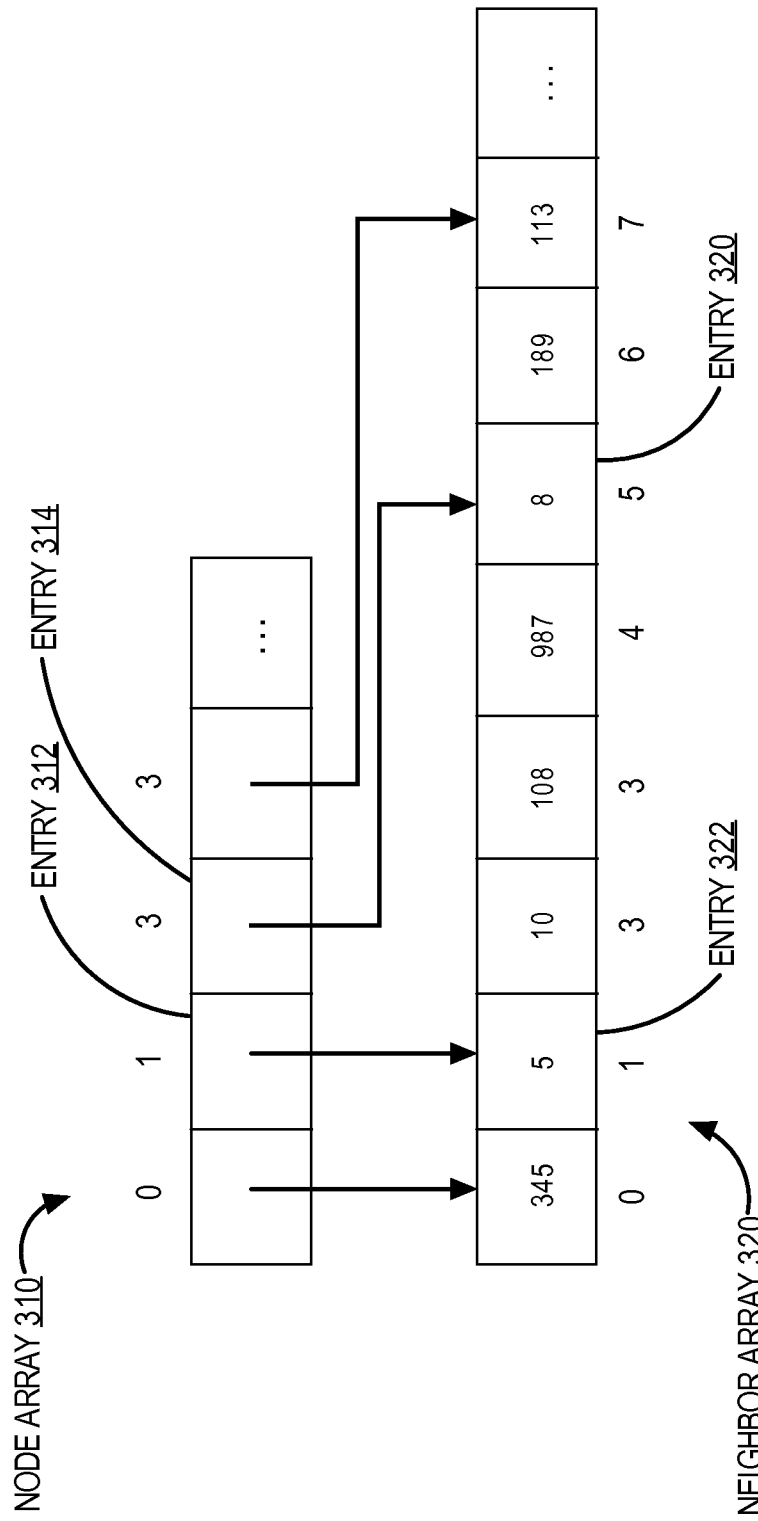
FIG. 3 is a block diagram that depicts two arrays of an in-memory representation of a graph: a node array and a neighbor array, in an embodiment.

Graph data 216 may be represented in any number of ways. Embodiments are not limited to any particular representation. FIG. 3 is a block diagram that depicts two arrays of an in-memory representation of a graph: a node array 310 and a neighbor array 320, in an embodiment. Each entry in node array 310 corresponds to a different node in a graph and includes a value (e.g., an index, a reference, or a pointer) that is used to identify an entry in neighbor array 320. For example, if a user of a social networking service has 1029 friends (or registered contacts) and a node in node array 310 corresponds to that user, then neighbor array 320 would include 1029 entries, one for each "friend" of the user.

In an embodiment, each of one or more entries in node array 310 includes one or more data values that indicate information about the corresponding node. For example, an entry in node array 310 includes a data value for one or more properties of the corresponding node. As noted previously, a property of a node may be a name, an age, a date, a time, a salary, or a description of some kind.

The "pointed-to" entry in neighbor array 320 that is "pointed to" by a "pointing" entry in node array 310 indicates that the node represented by the "pointed-to" entry is a "neighbor" of the node represented by the "pointing" entry. For example, entry 312 in node array 310 may include an index value (e.g., '1') that corresponds to entry 322 in neighbor array 320. Thus, with respect to entry 322, entry 322 is a "pointing" entry. Entry 312 is the second position in node array 310. If each node in a graph (that comprises N nodes) is given a unique value from 0 to N−1, then entry 312 corresponds to node '1' which can be used to index into node array 310 at the second position. Entry 322 includes the value '5', indicating that it can be used to index into node array 310 at the sixth position.

The neighbors of a particular node indicated in node array 310 may be determined based on (1) the "pointed-to" entry (in neighbor array 320) that the "pointing" node indicates (or references) and (2) the entry (in neighbor array 320) that the node subsequent to the "pointing" node in node array 310 indicates (or references). For example, entry 312 indicates (or references) entry 322 in neighbor array 320. Entry 314 indicates (or references) entry 330. All entries between entry 322 and entry 330 (including entry 322 and excluding entry 330) are neighbors of entry 312. Thus, the neighbors of the node indicated by entry 312 are nodes 5, 10, 108, and 987.

The set of neighbors that are indicated in neighbor array 320 and that correspond to a particular node in node array 310 is referred to herein as the "neighbor list" of the particular node. Each neighbor list is indicated by a contiguous set of entries in neighbor array 320.

In an embodiment, each neighbor list in neighbor array 320 is sorted by node value. If each neighbor list in neighbor array 320 is not sorted initially, then each neighbor list may be ordered before graph analysis operations are performed on the graph data, such as identifying common neighbors or counting triangles.

In a related embodiment, an entry in node array 310 includes two values that are used to identify neighbors of the entry. For example, entry 312 may include the values '1' and '4'. The neighbor list of entry 312 may then be determined as the nodes between (and including) the second entry and the fifth entry in neighbor array 320.

High-Level Graph-Specific Language

In an embodiment, a graph analytic program that a user composes is written in a high-level programming language that is domain specific. Such a language is referred to herein as a "graph-specific language" (GSL). A GSL is a type of a domain-specific language (DSL), which is a computer language that is specialized to a particular application domain. This is in contrast to a general-purpose language, which is broadly applicable across domains, and generally lacks specialized features for a particular domain.

The GSL described herein is an imperative language. Imperative programming is different than declarative and functional programming. Imperative programming is focused on describing how a program operates. Imperative programming is a programming paradigm that describes computation in terms of statements that change a program state. Examples of imperative programming languages are Java and C++. However, such programming languages are not domain specific.

In an embodiment, features of a GSL include one or more of the following:
  declarations of variables (of a specified type) in the middle of a graph analytic program; the variables may be assigned and referenced
  native data types, such as Graph, Vertex, Edge, Vertex property, edge property, each of which may be declared in the middle of the graph analytic program
  primitive data types, such as integer, float, long, double, Boolean, and string
  primitive arithmetic and logical operators, such as +, −, *, /, &&, OR
  primitive control structures, such as if-then-else and "while{ }"
  primitive reduction operators, such as reduce-by-sum (+=), multiplication (*=), minimum (min=), maximum (max=), logical-and (&=), logical-or (|=), and logical-xor (^=)

Reductions are used inside the parallel context and guarantee a deterministic result.

Two different syntaxes may be used for reduce-by-sum, though both have the same semantics:

```
int x = sum(n : G.nodes) {n.foo}
or
int x=0;
foreach(n : G.nodes)
   x+=n.foo;
```

The following are example graph operations that may be defined in the GSL:
  iterating neighbors of a vertex, both incoming and outgoing neighbors (the program may specify the iteration to be parallel or sequential)
  iterating common neighbors of two vertices (the program may specify the iteration to be parallel or sequential)
  traversing a graph in breadth-first search (BFS) order or depth-first search (DFS) order starting from a given node/vertex
  selecting a random node/vertex in a graph
  selecting a random (incoming or outgoing) neighbor of a node/vertex
  accessing a property of a node/vertex or an edge
  obtaining a source or destination node/vertex of an edge
  obtaining an edge that connects to a specified neighbor from a node/vertex
  checking whether an edge exists between two given nodes The following are example abstract data types that a GSL may support:
  sequence (or queue): an ordered collection of non-unique elements
  set: an unordered collection of unique elements order (or permutation): an ordered collection of unique elements bag: an unordered collection of non-unique elements map: an association of one type of element (e.g., key) to another type of element (e.g., value)

A "collection" may comprise nodes or edges. If ordered (such as a "sequence" or an "order"), the ordering criterion may be a node/edge property. For example, the following code may be used to create a new collection: "Create Collection NewColl OrderBy(node.foo)" where 'foo' is a node or edge property upon which ordering is based and 'NewColl' is a variable name for a new collection.

Example Graph Analytic Programs

The following are example graph analytic programs written in a high-level imperative DSL. In Program A, a pagerank procedure is defined:

Program A

```
procedure pagerank(G: graph, e,d: double, max_iter_count: int; pg_rank:
nodeProp<double>) {
    double diff;
    int cnt = 0;
    double N = G.numNode( );
    G.pg_rank = 1 / N;
    do {
        diff = 0.0;
        foreach (t: G.nodes) {
            double val = (1-d) / N + d * sum(w: t.inNbrs) { w.pg_rank /
                w.outDegree( )
            };
            diff += | val - t.pg_rank |;
            t.pg_rank <= val @ t;
        }
        cnt++;
    } while ((diff > e) && (cnt < max_iter_count));
}
```

In Program A, procedure "pagerank" takes, as input, variables G (which is of type graph), e and d (which are of type double), max_iter_count (which is of type integer), and pg_rank (which is a node property of type double).

Program B is part of a graph analytic program that defines a triangle counting procedure, which returns a value of type long.

Program B

```
procedure triangle_counting(G: graph): long {
    // undirected version
    long T = 0;
    foreach(u: G.nodes) {
        foreach(v: u.nbrs) (v > u) {
            foreach(w: u.nbrs) (w > v) {
                if ((v.hasEdgeTo(w))) {
                    T++;
                }
            }
        }
    }
    return T;
}
```

In Program B, 'u.nbrs' returns the neighbors of node u and v.hasEdgeTo(w) returns a Boolean value that indicates where node v has an edge to (or is connected to) node w.

Program C (which includes comments) is part of a graph analytic program that defines a depth-first search procedure:

Program C

```
procedure dfs_example(G : graph, t : node) {
    nodeSequence Seq;
    inDFS(n:G.nodes from t) {
        // do nothing at pre-visit
    }
    inPost{
        // add nodes to list on post-visit
        Seq.pushFront(n);
    }
}
```

This procedure takes, as input, a graph (G) and a node (t). 'inDFS' iterates over all nodes in graph G using depth-first search (DFS) starting at node t. In the 'inDFS' block, the user can specify what should be done when the current vertex n is first visited during the search. If necessary, the user can additionally specify in the 'inPost' block what should be done after all the neighbors of current vertex n is visited and, thus, visitation of vertex n is finished.

Graph Program Compilation

As described previously, graph database system 200 includes graph program compiler 212 that takes a graph analytic program written in a high-level GSL with one or more of the above-described features and generates an executable that, when executed, directly accesses graph data, which is an in-memory representation of a graph.

Graph program compiler 212 maps data types in the graph analytic program (e.g., graph, vertex, edge, order, bag) into the internal representation of the database. These data types are abstract while their concrete implementations are open to implementers. In an embodiment, the Graph data type is mapped to a CSR representation. In a related embodiment, Vertex (or Node) and Edge data types are mapped to long integers. Additionally, collection data types (such as bag, set, order) are mapped to another custom implementation. While concrete implementations can change or improve over time, a user's DSL program is not required to be modified.

In an embodiment, graph program compiler 212 maps graph iteration and traversal operators specified in a graph analytic program into prepared efficient implementations. For example, graph program compiler 212, when analyzing a graph analytic program, identifies a breadth-first search traversal. An example of a prepared efficient implementation is described in Sungpack Hong et al., Efficient Parallel Graph Exploration on Multi-Core CPU and GPU, PACT 2011, which is incorporated herein by reference as if fully disclosed herein.

In an embodiment, graph database system 200 supports a compiler that is configured to compile the same graph analytic program into different executables. For example, the same DSL program may be compiled into (1) an implementation for processing an in-memory graph representation and (2) an implementation for processing a distributed graph representation. In a related embodiment, even for an in-memory graph representation, the compiler supports multiple CSR implementations, such as one implementation using C++ and another implementation using Java. Additionally, one or more in-memory graph representations other than CSR may be used, such as DOK (Dictionary of Keys), LIL (List of Lists), or COO (Coordinate List). In this way, a single compiler may be used to compile the same graph analytic program into different implementations.

Graph Program Compilation: Parallelism

In an embodiment, graph program compiler 212 identifies one or more portions of a graph analytic program and generates parallelized executable code that corresponds to the one or more program portions. Examples of portions that graph program compiler 212 identifies include node neighbor iteration and breadth-first search (BFS) traversal. In the previous triangle counting example, "foreach(n: G.nodes)" is a parallel iteration over all nodes in graph G. As another example, "inBFS(n: G.nodes from t)" is a parallel breadth-first search over all nodes in graph G starting at node t. The DSL language specifically defines parallel loops (e.g., foreach) and parallel traversals (e.g., BFS). However, the compiler is free to change parallel loops and traversals into sequential loops and traversals.

In a related embodiment, in the case of nested parallelism, the compiler may decide not to parallelize all the nesting levels. That is, the compiler may choose to parallelize only innermost or outermost parallel loops, depending on the program context. A factor that the compiler may take into account when determining whether and which nesting level to parallel is the number of work items and the size of each work item. The compiler makes a selection that will generate enough work items to keep all threads busy while keeping the size of the work items small enough.

For example, in the triangle counting example program described previously, there are two foreach loops nested inside the outermost foreach block. In that example, only the outermost foreach block is parallelized because (1) the compiler rewrites the innermost foreach block, which becomes a common neighbor iteration and (2) the middle foreach block is only over a node's neighbors, which will not create enough work items.

In the following example, a compiler determines to parallelize only the inner BFS traversal but determines to serialize the outer loop, since BFS provides enough parallelism by itself.

```
foreach(s: G.nodes)
    inBFS(t: G.nodes from s) {
        // do something
    }
```

Graph Program Compilation: Type Checking

In an embodiment, graph program compiler 212 inserts, into executable code, type checking code. For example, type checking code, when executed, determines whether node and/or edge properties stored in graph database 230 and/or the graph data in volatile memory are different than the corresponding properties described in a graph analytic program. Example types include integer, double, long, and string.

For example, a graph analytic program declares the node property named 'foo' to be of type double. When the graph analytic program is executed, the generated type checking code detects that the node property 'foo' of the graph data the program is executed on is actually of type string and returns an error. Thus, if there is a difference, then the remainder of the executable is not executed. Instead, the executable may return error data that is displayed to a user that submitted the graph analytic program.

In a related example, if the actual type is type integer (instead of type string), then the execution engine might convert the integer type to double type and continue. Thus, instead of returning an error, the executable may attempt to perform a type conversion in order to ensure that the executable can proceed.

Graph Program Compilation: Cancelation

In an embodiment, graph program compiler 212 inserts, into executable code, cancel check code, which, when executed, determines whether a cancelation flag is set. If so, then the executable ceases execution. One or more cleanup operations may be performed an execution engine, such as memory deallocation for any objects and variables that were generated during execution of the executable and for the executable itself.

Graph program compiler 212 may generate the cancelation flag and an execution engine maintains the cancelation flag during runtime. The cancelation flag reflects a user's cancelation request that the user submits to graph database system 200 sometime after graph program server 220 receives the graph analytic program and before the executable for the graph analytic program is fully executed.

Graph program compiler 212 may analyze the graph analytic program to identify certain portions to determine where, in corresponding portions of the executable, to insert the cancel check code. For example, graph program compiler 212 determines a sequential iteration (such as a do-while) or a chunked parallel iteration (such as a foreach). Graph program compiler 212 inserts cancel check code at the beginning of the chunked sequential or parallel iteration, such as at the beginning of a do-while block. In this way, if executing the executable is taking a significant amount of time, then a user can provide input that causes the cancelation flag to be set. Later, when the cancel check code is executed and the cancelation flag is checked, the executable ceases to execute.

Graph Program Compilation: Isolation

In an embodiment, graph program compiler 212 creates an executable that is configured to create, in local private memory of graph database system 210, variables that exist only during execution of a graph executable. When the executable completes, the variables are destroyed and the associated memory deallocated. The executable calls cleanup procedures that are inserted by the compiler and that are implemented by the execution engine at the end of the executable. The cleanup procedures ensure that only local, private data is destroyed, which was needed for computation. In other words, the variables are not persistent and are not "visible" to other executables of other graph analytic programs that may be running concurrently. The graph itself would not be deallocated.

In a related embodiment, node and/or edge properties that are locally defined in an executable are created in a private transient memory space and are deleted upon termination of the executable. After computation is performed, a user may choose to persist the result or not. As an example of when persistence of a node property is not persisted, a graph analytic program calls pagerank multiple times and displays the top ten vertices in a graph with the highest pagerank values to see of the impact of different parameters. After each computation, the result is discarded and not persisted.

Graph Program Compilation: Transaction

In an embodiment, graph program compiler 212 inserts, into executable code, transaction-related code that encapsulates at least a portion of the program code within a transaction. Examples of transaction-related code include "Transaction trans=createNewTransaction( );", "trans.begin( );", and "trans.end( );".

Transaction-related code may encapsulate the entire program code such that either the changes of the entire program are committed or nothing is committed. Alternatively, transaction-related code may encapsulate a strict subset of the program code. For example, the compiler identifies portions of the program code that call for modifying graph data, such as adding nodes/edges, deleting nodes/edges, or updating existing node/edge attributes. Thus, if the compiler identifies, within the program code, multiple locations in which graph data is modified, then the compiler may insert transaction-related code before and after each of those locations.

Configuration Data

Graph data stored in a graph database may be associated with configuration data. The configuration data may apply on a per-graph basis or may apply to all graphs stored in the graph database. Configuration data may indicate that certain graph data is read-only. Thus, if a compiler determines that a graph program calls for the modification of a graph, then the compiler, based on the configuration data, may reject the graph program. Configuration data may alternatively indicate that graph data may be modified using transactional-semantics. Thus, if a compiler determines that a graph program calls for the modification of a graph, then the compiler, based on the configuration data, may insert transaction-related code into the executable.

Benefits of Embodiments

Some embodiments described herein increase a user's productivity because a user can program graph algorithms in an intuitive high-level language instead of using low-level data access languages. Also, parallelization of graph algorithms is simplified. Parallelism is implicitly encoded in a graph analytic program through simple high-level operators in the programming language. The operators are exploited by the compiler to produce a parallel executable.

Some embodiments provide a performance advantage over conventional graph databases. Such techniques eliminate all performance overhead induced by a data access layer. Such overhead is significant because graph programs typically perform numerous data accesses. Additionally, a compiler of embodiments may apply optimizations that increase performance.

Some embodiments improve portability. Because a graph analytic program is a high-level program that comprises operations on abstract data types, the compiler is free to translate the program into very different executables, depending on how the underlying graph is represented in memory. Therefore, even after the underlying graph database changes, the same high-level graph analytic program can be used.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
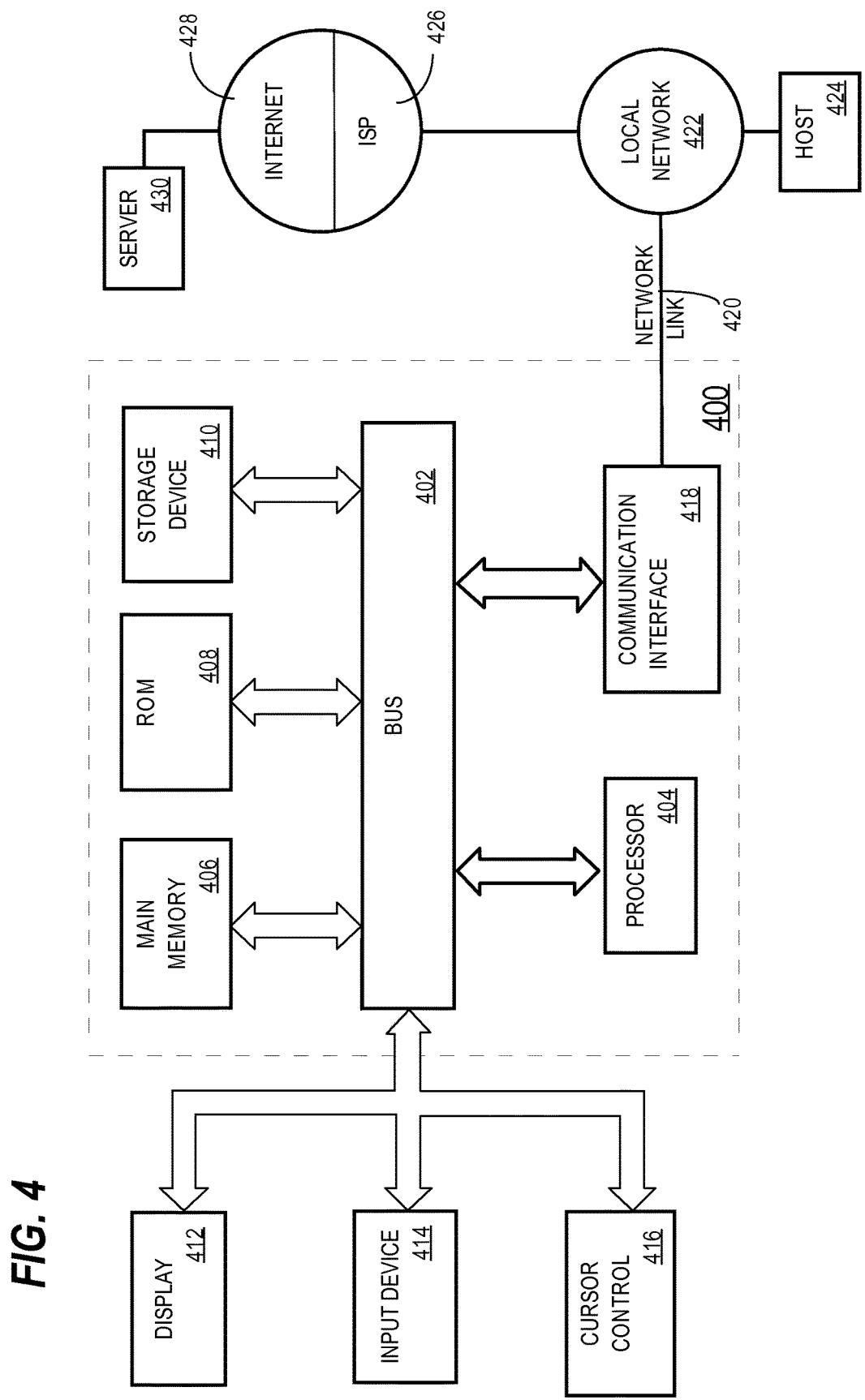
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, from a client device, at a graph database system, a graph analytic program that is written in a graph-specific programming language;
   in response to receiving the graph analytic program, compiling, at the graph database system, the graph analytic program to generate executable code;
   prior to or in response to receiving the graph analytic program, loading, from a graph database into volatile memory of the graph database system, graph data;
   executing the executable code to directly access the graph data, wherein the graph data in volatile memory is in a first format and the corresponding version of graph data in the graph database is in a second format;
   generating, at the graph database system, results of executing the executable code;
   sending the results from the graph database system to the client device;
   wherein the method is performed by one or more computing devices.

2. The method of claim 1, wherein executing the executable code comprises:
   creating variables in local private memory, of the volatile memory, wherein the variables are not accessed during execution of other executables in the graph database;
   after the executable code is done executing, deleting the variables.

3. The method of claim 1, wherein:
   compiling the graph analytic program comprises inserting, into the executable code, transaction-related code that, when executed, begin one or more transactions and end the one or more transactions.

4. The method of claim 3, wherein:
   compiling the graph analytic program comprises analyzing the graph analytic program to identify, within the graph analytic program, one or more locations in which a portion of the graph data is modified;
   inserting comprises inserting the transaction-related code into the executable code based on the one or more locations.

5. The method of claim 1, further comprising:
   storing, at the graph database system, configuration data that indicates that a first graph is read-only;
   receiving, at the graph database system, a second graph analytic program that is written in the graph-specific programming language and that targets the first graph;

in response to receiving the second graph analytic program, analyzing, at the graph database system, the second graph analytic program;

wherein analyzing the second graph analytic program comprises determining whether the second graph analytic program, if processed, would modify the first graph;

in response to determining that the second graph analytic program, if processed, would modify the first graph, rejecting the second graph analytic program.

6. The method of claim 1, further comprising:

receiving, at the graph database system, a second graph analytic program that is written in the graph-specific programming language and that targets a first graph;

in response to receiving the second graph analytic program, compiling, at the graph database system, the second graph analytic program to generate a second executable;

wherein compiling the second graph analytic program comprises inserting, into the second executable, cancel code that, when executed, checks a flag variable;

while executing the second executable, executing the cancel code to determine whether the flag variable is set;

if the flag variable is set, then ceasing to execute the second executable.

7. The method of claim 1, further comprising:

receiving, at the graph database system, a second graph analytic program that is written in the graph-specific programming language and that targets a first graph;

in response to receiving the second graph analytic program, compiling, at the graph database system, the second graph analytic program to generate a second executable;

wherein compiling the second graph analytic program comprises inserting, into the second executable, type check code that, when executed, checks whether an object property stored in the graph database system is the same as an object property indicated in the second graph analytic program;

while executing the second executable, executing the type check code to determine whether the object property stored in the graph database system is the same as the object property indicated in the second graph analytic program;

if the object property stored in the graph database system is not the same as the object property indicated in the second graph analytic program, then ceasing to execute the second executable.

8. The method of claim 1, wherein compiling the graph analytic program to generate the executable code comprises:

identifying a portion of the graph analytic program that can benefit from parallelization, and generating, of the executable code, a particular portion that is parallelized and that corresponds to the portion of the graph analytic program.

9. The method of claim 8, wherein compiling the graph analytic program to generate the executable code comprises:

identifying, within the graph analytic program, a plurality of nesting levels;

determining to parallelize a first nesting level of the plurality of nesting levels;

determining to parallelize a second nesting level, of the plurality of nesting levels, that is different than the first nesting level;

wherein the first nesting level is within the second nesting level or the second nesting level is within the first nesting level.

10. The method of claim 1, wherein:

graph, vertex, and edge are native data types of the graph-specific programming language;

the graph-specific programming language defines an operator for iterating neighbors of a vertex;

the graph-specific programming language defines an operator for iterating common neighbors of two vertices; or the graph-specific programming language defines an operator for selecting a random neighbor of a given vertex.

11. The method of claim 1, wherein the first format is different than the second format.

12. One or more non-transitory storage media storing instructions which, when executed by one or more computing devices, cause:

receiving, from a client device, at a graph database system, a graph analytic program that is written in a graph-specific programming language;

in response to receiving the graph analytic program, compiling, at the graph database system, the graph analytic program to generate executable code;

prior to or in response to receiving the graph analytic program, loading, from a graph database into volatile memory of the graph database system, graph data;

executing the executable code to directly access the graph data, wherein the graph data in volatile memory is in a first format and the corresponding version of graph data in the graph database is in a second format;

generating, at the graph database system, results of executing the executable code;

sending the results from the graph database system to the client device.

13. The one or more non-transitory storage media of claim 12, wherein executing the executable code comprises:

creating variables in local private memory, of the volatile memory, wherein the variables are not accessed during execution of other executables in the graph database;

after the executable code is done executing, deleting the variables.

14. The one or more non-transitory storage media of claim 12, wherein:

compiling the graph analytic program comprises inserting, into the executable code, transaction-related code that, when executed, begin one or more transactions and end the one or more transactions.

15. The one or more non-transitory storage media of claim 14, wherein:

compiling the graph analytic program comprises analyzing the graph analytic program to identify, within the graph analytic program, one or more locations in which a portion of the graph data is modified;

inserting comprises inserting the transaction-related code into the executable code based on the one or more locations.

16. The one or more non-transitory storage media of claim 12, wherein the instructions, when executed by the one or more processors, further cause:

storing, at the graph database system, configuration data that indicates that a first graph is read-only;

receiving, at the graph database system, a second graph analytic program that is written in the graph-specific programming language and that targets the first graph;

in response to receiving the second graph analytic program, analyzing, at the graph database system, the second graph analytic program;

wherein analyzing the second graph analytic program comprises determining whether the second graph analytic program, if processed, would modify the first graph;

in response to determining that the second graph analytic program, if processed, would modify the first graph, rejecting the second graph analytic program.

17. The one or more non-transitory storage media of claim 12, wherein the instructions, when executed by the one or more processors, further cause:

receiving, at the graph database system, a second graph analytic program that is written in the graph-specific programming language and that targets a first graph;

in response to receiving the second graph analytic program, compiling, at the graph database system, the second graph analytic program to generate a second executable;

wherein compiling the second graph analytic program comprises inserting, into the second executable, cancel code that, when executed, checks a flag variable;

while executing the second executable, executing the cancel code to determine whether the flag variable is set;

if the flag variable is set, then ceasing to execute the second executable.

18. The one or more non-transitory storage media of claim 12, wherein the instructions, when executed by the one or more processors, further cause:

receiving, at the graph database system, a second graph analytic program that is written in the graph-specific programming language and that targets a first graph;

in response to receiving the second graph analytic program, compiling, at the graph database system, the second graph analytic program to generate a second executable;

wherein compiling the second graph analytic program comprises inserting, into the second executable, type check code that, when executed, checks whether an object property stored in the graph database system is the same as an object property indicated in the second graph analytic program;

while executing the second executable, executing the type check code to determine whether the object property stored in the graph database system is the same as the object property indicated in the second graph analytic program;

if the object property stored in the graph database system is not the same as the object property indicated in the second graph analytic program, then ceasing to execute the second executable.

19. The one or more non-transitory storage media of claim 12, wherein compiling the graph analytic program to generate the executable code comprises:

identifying a portion of the graph analytic program that can benefit from parallelization, and generating, of the executable code, a particular portion that is parallelized and that corresponds to the portion of the graph analytic program.

20. The one or more non-transitory storage media of claim 19, wherein compiling the graph analytic program to generate the executable code comprises:

identifying, within the graph analytic program, a plurality of nesting levels;

determining to parallelize a first nesting level of the plurality of nesting levels;

determining to parallelize a second nesting level, of the plurality of nesting levels, that is different than the first nesting level;

wherein the first nesting level is within the second nesting level or the second nesting level is within the first nesting level.

21. The one or more non-transitory storage media of claim 12, wherein:

graph, vertex, and edge are native data types of the graph-specific programming language;

the graph-specific programming language defines an operator for iterating neighbors of a vertex;

the graph-specific programming language defines an operator for iterating common neighbors of two vertices; or the graph-specific programming language defines an operator for selecting a random neighbor of a given vertex.

22. The one or more non-transitory storage media of claim 12, wherein the first format is different than the second format.

* * * * *

UNITED STATES PATENT AND TRADEMARK OFFICE
CERTIFICATE OF CORRECTION

PATENT NO. : 9,916,187 B2  
APPLICATION NO. : 14/524838  
DATED : March 13, 2018  
INVENTOR(S) : Schmid et al.

Page 1 of 1

It is certified that error appears in the above-identified patent and that said Letters Patent is hereby corrected as shown below:

On the Title Page

Item (54), under Title, Line 5, delete "PROGRAMMING" and insert -- PROGRAMING --, therefor.

In the Specification

In Column 1, Line 5, delete "PROGRAMMING" and insert -- PROGRAMING --, therefor.

In Column 3, Line 38, delete "result." and insert -- results. --, therefor.

Signed and Sealed this  
Twenty-ninth Day of December, 2020

Andrei Iancu  
*Director of the United States Patent and Trademark Office*